(12) United States Patent
Welch

(10) Patent No.: US 7,340,263 B2
(45) Date of Patent: Mar. 4, 2008

(54) METHODS AND APPARATUS FOR DISPLAYING TEXTUAL DATA EMBEDDED IN BROADCAST MEDIA SIGNALS

(75) Inventor: Michael Shannon Welch, Raleigh, NC (US)

(73) Assignee: Sony Ericsson Mobile Communications AB (SE)

( * ) Notice: Subject to any disclaimer, the term of this patent is extended or adjusted under 35 U.S.C. 154(b) by 357 days.

(21) Appl. No.: 10/295,724

(22) Filed: Nov. 15, 2002

(65) Prior Publication Data

US 2004/0097246 A1    May 20, 2004

(51) Int. Cl.
*H04Q 7/20* (2006.01)
*H04B 1/38* (2006.01)
*H04N 7/00* (2006.01)

(52) U.S. Cl. .................. 455/466; 455/560; 348/552

(58) Field of Classification Search ............. 455/466, 455/560, 566, 3.1, 6.1, 4.2, 420, 6.3, 151, 455/8.3; 348/552, 734, 725, 12, 13
See application file for complete search history.

(56) References Cited

U.S. PATENT DOCUMENTS

| | | | |
|---|---|---|---|
| 6,097,441 A | * | 8/2000 | Allport ....................... 348/552 |
| 6,182,094 B1 | * | 1/2001 | Humpleman et al. ....... 715/513 |
| 6,263,245 B1 | * | 7/2001 | Snell ........................... 607/60 |
| 6,400,407 B1 | | 6/2002 | Zigmond et al. ........... 348/465 |
| 2002/0059637 A1 | | 5/2002 | Rakib .......................... 725/119 |
| 2003/0130864 A1 | * | 7/2003 | Ho et al. ....................... 705/1 |
| 2003/0194200 A1 | * | 10/2003 | Yuen et al. .................. 386/46 |
| 2004/0005900 A1 | * | 1/2004 | Zilliacus ..................... 455/466 |
| 2004/0139469 A1 | * | 7/2004 | Incentis Carro ............ 725/91 |
| 2005/0028222 A1 | * | 2/2005 | Megeid ...................... 725/135 |

FOREIGN PATENT DOCUMENTS

| | | |
|---|---|---|
| EP | 1204275 A2 | 5/2002 |
| GB | 2343073 A | 4/2000 |
| GB | 2370456 A | 6/2002 |

* cited by examiner

*Primary Examiner*—Naghmeh Mehrpour
(74) *Attorney, Agent, or Firm*—Myers Bigel Sibley & Sajovec, P.A.

(57) ABSTRACT

According to embodiments of the present invention, a broadcast media signal is received at a broadcast media receiver. The broadcast media signal includes textual data. The textual data is extracted and is transmitted over a wireless coupling to a wireless terminal.

16 Claims, 3 Drawing Sheets

METHODS AND APPARATUS FOR DISPLAYING TEXTUAL DATA EMBEDDED IN BROADCAST MEDIA SIGNALS

BACKGROUND

1. Technical Field

The present invention relates to the broadcast media systems and more particularly, to the integration of textual messages within broadcast media signals.

2. Description of the Related Art

Some broadcast television signals include close captioned text messages. The text messages sometimes appear at the bottom of a television display during movies, news casts and other productions. The closed captions generally correspond to words that are spoken in the production and typically appear and disappear coincident with the spoken words. The usefulness of closed captioned text messages may be limited by a user's ability to read the text on a television display and to remember the text message after it disappears.

SUMMARY OF THE INVENTION

According to embodiments of the present invention, a broadcast media signal is received at a broadcast media receiver. The broadcast media signal includes textual data. The textual data is extracted and is transmitted over a wireless coupling to a wireless terminal.

According to additional embodiments of the present invention, the broadcast media signal may comprise a television signal and the textual data may comprise closed captioned text. In still other embodiments, the textual data may be transmitted to the wireless terminal according to a Bluetooth, cellular, or wireless local area network protocol. The transmitted textual data may include a phone number, a logical network address, program instructions, and/or software code. The wireless terminal may then initiate a phone call using the phone number and/or initiate a network connection using the logical network address. In still other embodiments, the transmitted textual data may include instructions for how the wireless terminal may format the textual data for its display.

DETAILED DESCRIPTION

The present invention will now be described more fully with reference to the accompanying drawings, in which typical embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those having skill in the art, the present invention may be embodied as methods or devices. Accordingly, the present invention may take the form of a hardware embodiment, a software embodiment, or an embodiment combining hardware and software aspects. The operations depicted in the diagrams, and combinations thereof, may be implemented in one or more electronic circuits, such as in one or more discrete electronic components, one or more integrated circuits (ICs) and/or one or more application specific integrated circuits (ASICs) and/or application specific circuit modules, as well as by computer program instructions which may be executed by a computer or other data processing apparatus, such as a microprocessor or digital signal processor (DSP). It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
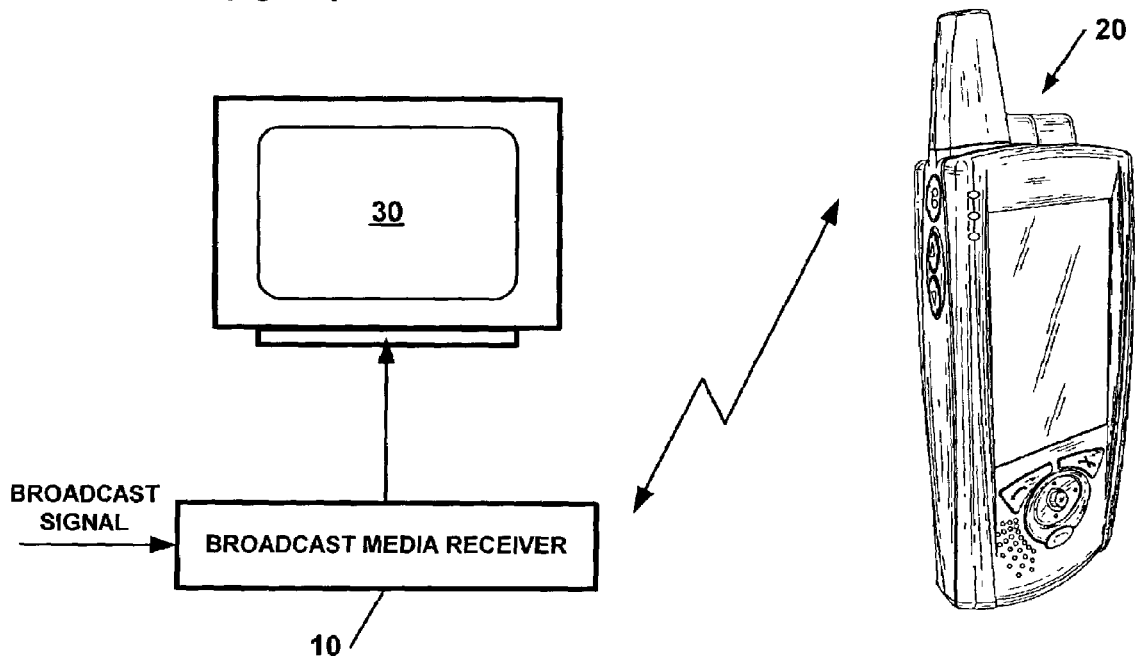
FIG. 1 is a block diagram illustrating a broadcast media receiver, a wireless terminal, and methods according to embodiments of the present invention.

FIG. 1 illustrates a broadcast media receiver 10 that communicates over a wireless coupling to a wireless terminal 20 according to embodiments of the present invention. The wireless terminal 20 may be remotely located from the broadcast media receiver 10. The broadcast media receiver 10 receives a broadcast media signal and extracts textual data therefrom. The textual data is transmitted over a wireless coupling to the wireless terminal 20.

According to some embodiments of the present invention, the broadcast media receiver 10 may also extract a video signal and/or an audio signal from the broadcast media signal. The video signal may be provided to a video display 30. The video display 30 may comprise a television screen, computer monitor, flat panel display, cathode ray tube, liquid crystal display, or other device for displaying video signals. The audio signal may be provided to speakers within the video display 30. In some embodiments, the broadcast media signal may comprise a broadcast television signal, such as a National Television Standards Committee (NTSC) signal, a Phase Alternate Lines (PAL) signal, a Sequential Couleur Avec Memoire (SECAM) signal, and/or a High Definition Television (HDTV) signal with embedded textual data. In other embodiments, the broadcast media signal may comprise a conventional FM, AM, radio, or satellite signal with embedded textual data. In still other embodiments, the broadcast media signal may be provided by a digital video disk (DVD) player or other video and/or audio source.

The broadcast media receiver 10 may be implemented as part of a set-top-box, for example, that is coupled with a television or other video screen. The coupling between a set-top-box and a television may be provided, for example, by electrical cables. In other embodiments of the present invention, the broadcast media receiver 10 may be integrated into the video display 30 so that no separate set-top-box is required.

In still further embodiments of the present invention, the broadcast media receiver 10 may include a central processing system that services more than one subscriber. The central processing system that may include conventional multimedia services that are provided by TiVO Inc., such as providing television channel searching, delivery of select channels, and other multimedia control features. The central processing system may extract textual data from the multimedia signal and communicate with the wireless terminal 20 via a wireless coupling (e.g., cellular, wireless local area network, satellite, or other wireless protocol) and/or via routing information through another device (e.g., a set-top box with a phone or network connection to a wireless system) that is capable of communicating via a wireless coupling to the wireless terminal 20.

The wireless terminal 20 may be a personal digital assistant and/or a radiotelephone according to some embodiments of the present invention. In one embodiment of the present invention, the wireless coupling between the broadcast media receiver 10 and the wireless terminal 20 is provided using the Bluetooth protocol. The Bluetooth protocol is discussed, for example, by Sailesh Rathi in the reference entitled "*Blue Tooth Protocol Architecture*" from Dedicated Systems Magazine, 2000 Q4, pages 28-33, the disclosure of which is hereby incorporated herein in its entirety by reference. In other embodiments of the present invention, the wireless coupling is provided using one or more cellular communication protocols that may include, but are not be limited to, code division multiple access (CDMA), wideband-CDMA, CDMA2000, UMTS, EDGE, time division multiple access (TDMA), and GSM. In other embodiments of the present invention, the wireless coupling is provided using a wireless local area network (WLAN) protocol, such as IEEE 802.11b, or an infra-red communication protocol.

Figure 2:
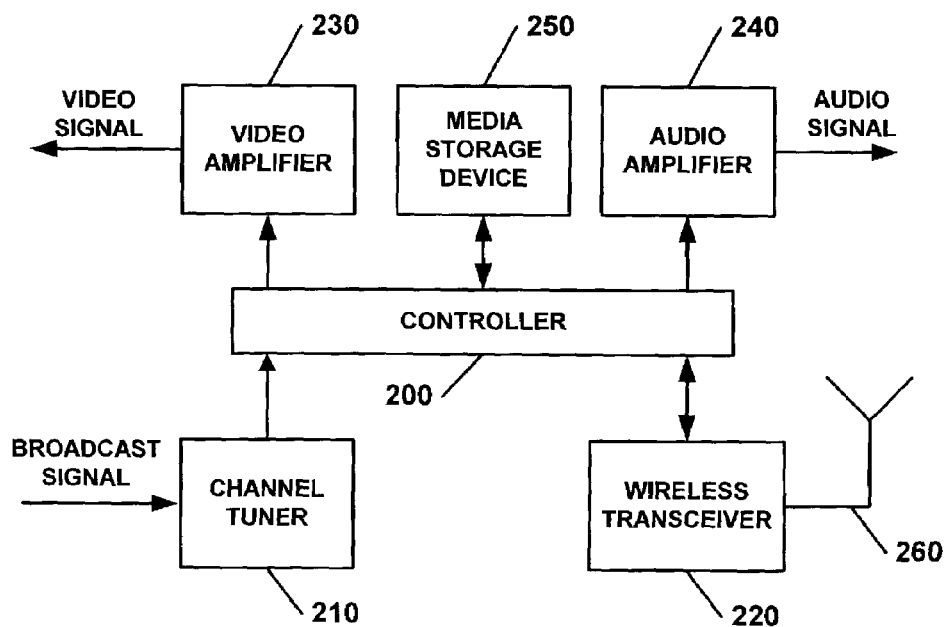
FIG. 2 is a block diagram of a broadcast media receiver according to embodiments of the present invention.

FIG. 2 illustrates a block diagram of the broadcast media receiver 10 according to embodiments of the present invention. The broadcast media receiver 10 may include a controller 200, a channel tuner 210, a wireless transceiver 220, a video amplifier 230, an audio amplifier 240, a media storage device 250, and an antenna 260.

The channel tuner 210 may be configured to receive a broadcast media signal from a terrestrial and/or satellite wireless transmission, and/or an electrical cable. The channel tuner 210 may output one or more tuned channels of the broadcast media signal to the controller 200. The controller 200 may format the broadcast media signal, and may provide it to the video amplifier 230 and/or the audio amplifier 240 for amplification, and then to the video display 30.

When textual data is present in the broadcast media signal, the controller 200 may extract and provide the textual data to the wireless transceiver 220 for transmission by the antenna 260. In some embodiments, the controller 200 may include a closed captioned decoder to extract the textual data. The closed captioned decoder may operate according to the Electronic Industries Alliance (EIA) standard EIA-608. The controller 200 and/or the wireless transceiver 220 may format the wireless transmission according to the Bluetooth protocol, a cellular communications protocol, a WLAN protocol, infra-red and/or another wireless protocol. The broadcast media signal may also be recorded on the media storage device 250, which may include, but is not limited to, a magnetic storage device, an optical storage device, and/or a nonvolatile semiconductor memory device. In some embodiments, the broadcast media signal is recorded in response to a recording command that may be received via the wireless transceiver 220 from the wireless terminal 20.

The broadcast media signal may include instructions for how the textual data may be formatted for a display. The instructions may be extracted from the broadcast media signal and transmitted to the wireless terminal 20, where they may be used to format and display the textual data. In some embodiments, the instructions may define the formatting of the textual data according to a conventional language, including, but not limited to, a hypertext markup language (HTML), an extensible markup language (XML), a JAVA language, a BREW language, and/or a wireless application protocol (WAP) language.

In this manner, embodiments of the present invention may enable a user to view closed captioned text on the wireless terminal 20. Such viewing may be desirable when the audio portion of a television program may not be heard, such in airport terminals where TV monitors are provided in noisy waiting areas. It may also be desirable to view closed captioned text on the wireless terminal 20 when the closed captioned text is not displayed on a television and/or when it is inconvenient, or not possible, for the user to read closed captioned text on a television.

Embodiments of the present invention may also enable further operations on the broadcast media signal and/or the textual data to be initiated in response to the contents of the textual data. For example, a sponsor of a television production, or commercial, may embed information in the television signal that enables a user to contact the sponsor. The contact information may be embedded by converting spoken words to closed captioned textual data that is transmitted with the television signal. The transmitted textual data may include a phone number, a logical network address, program instructions, and/or software code.

In some embodiments of the present invention, the broadcast media receiver 10 may extract the textual data from the broadcast media signal, and may transmit the textual data to the wireless terminal 20 where it may be displayed to a user. The user may then select a displayed phone number, or other associated displayed indicia, to cause the wireless terminal 20 to dial the phone number. Similarly, the user may select a displayed logical network address, or other associated displayed indicia, to cause the wireless terminal 20 to initiate a network connection.

In other embodiments, the user may store the textual data in the wireless terminal 20 for future reference. The wireless terminal 20 may be configured to allow the user to forward the textual data to other devices, including another wireless terminal, a telephone, and/or a computer. In some embodiments, the textual data may be forwarded via an internet mail service and/or via a cellular short message service (SMS).

In further embodiments, the broadcast media receiver 10 and/or the wireless terminal 20 are configured to determine whether one or more keywords or other criteria are present in the textual data. In some embodiments, the textual data may be searched for the name of a television show, a person's name, a telephone number or logical network address, a text string that may be defined by a user, program instruction, and/or software code. When the broadcast media receiver 10 performs the search, the textual data may be transmitted to the wireless terminal 20 in response to finding the searched term or criteria in the textual data.

When the wireless terminal 20 performs the search, the wireless terminal may signal a user in response to finding the searched term or criteria. Such signaling may include providing a signaling tone and/or displaying a visual cue to a user.

In further embodiments, the wireless terminal 20 may transmit a message to cause the broadcast media receiver 10 to store the textual data and/or the broadcast signal in the media storage device 250. The wireless terminal 20 may additionally, or alternatively, transmit a message to the broadcast media receiver 10 to cause the channel tuner 210 to change one or more channels that it provides to the controller 200. In this manner, a user may use the wireless terminal 20 to view a schedule of present and/or upcoming television events and command the broadcast media receiver 10 to record a television event or to change television channels.

When the broadcast media receiver 10 includes a central processing system that services more than one subscriber, a user may communicate via the wireless terminal 20 to command the central processing system to perform one or more functions that are unique to the subscribers account. For example, a user may command the central processing system to record a television event, to transmit a selected channel to a device that is selected by a user, and/or to define criteria upon which further searching is to be performed by the central processing system.

Figure 3:
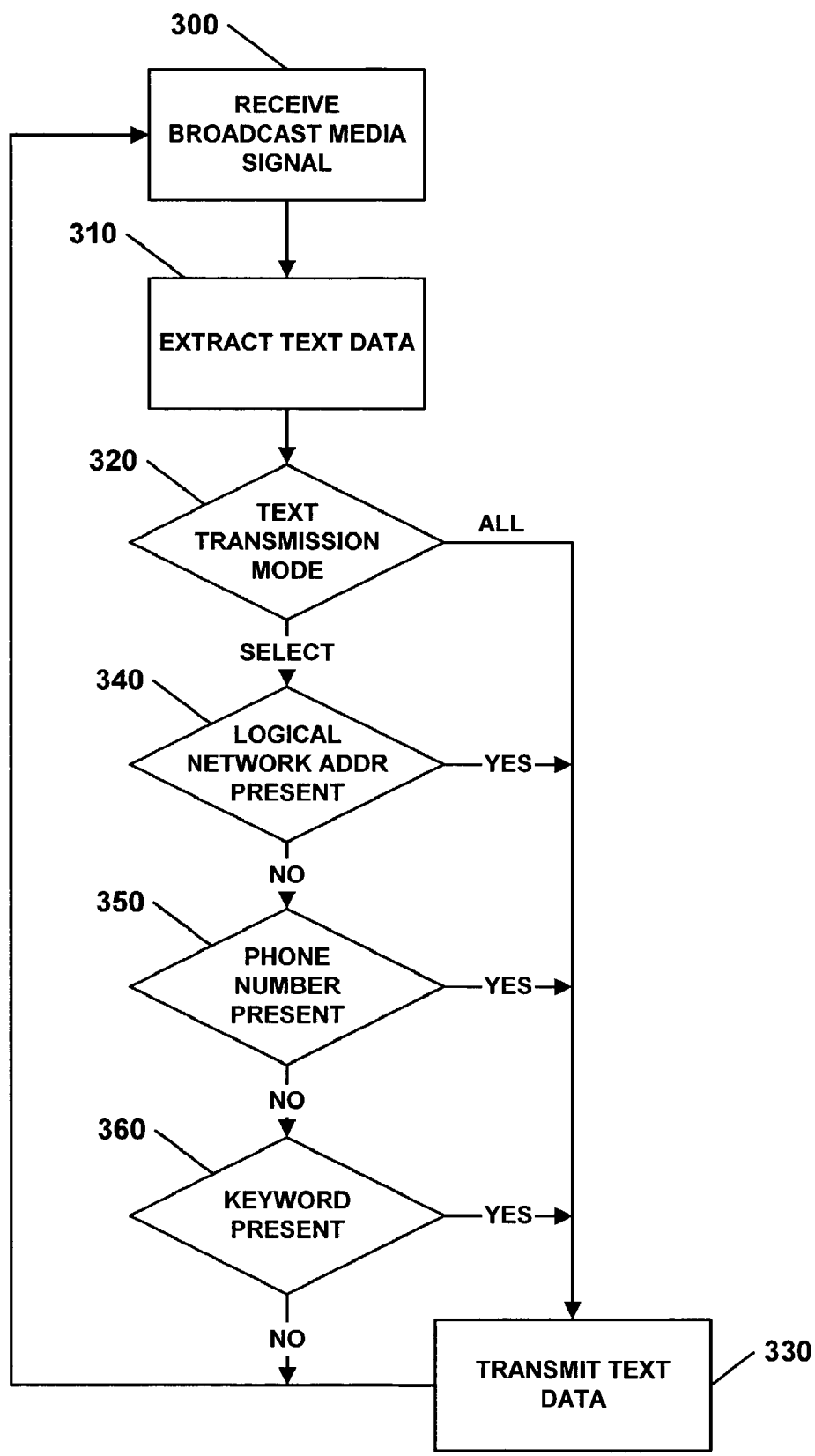
FIG. 3 is an operational flowchart of a broadcast media receiver according to embodiments of the present invention.

According to some embodiments of the present invention, a broadcast media receiver may perform the operations that are illustrated by the block diagram in FIG. 3. The broadcast media signal is received at Block 300. Textual data is extracted from the broadcast media signal at Block 310. In one operational mode, a decision may be made at Block 320 to transmit the extracted textual data, at Block 330, without first checking the content of the textual data. In another operational mode, the decision at Block 320 may be to transmit the extracted textual data, at Block 330, only when the textual data is determined to contain a logical network address, a phone number, or a keyword, at Blocks 340-360 respectively.

In some embodiments, the logical network address may comprise a Uniform Resource Locator (URL) or other address for identifying a device on a network. The keyword comparison at Block 360 may be made to a one or more keywords that may have been defined by a user. The determination at Block 360 may include searching the extracted textual data for the name of a television show, a person's name, a phone number, a logical network address, a defined text string, program instructions, and/or software code.

Figure 4:
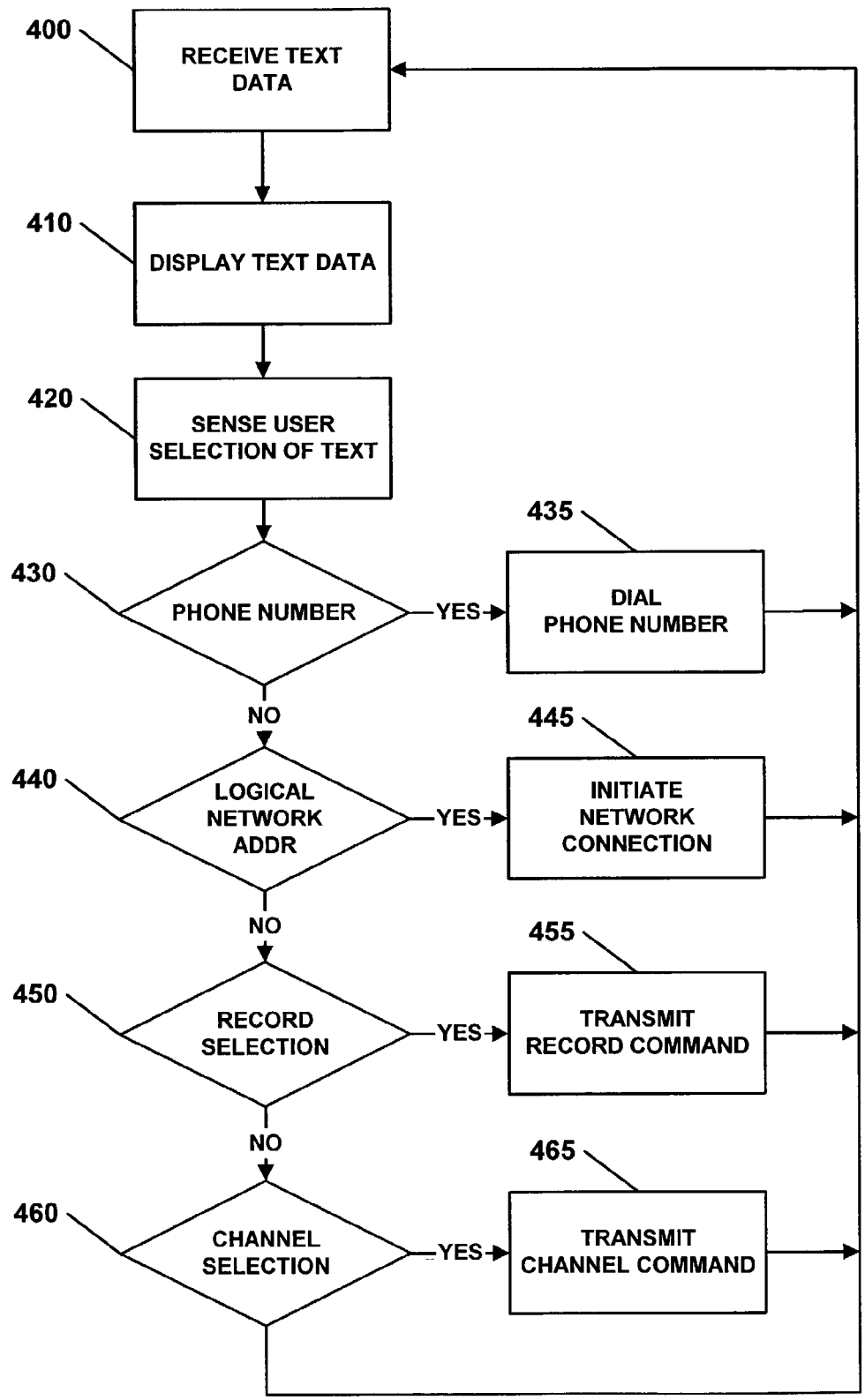
FIG. 4 is an operational flowchart of a wireless terminal according to embodiments of the present invention.

FIG. 4 illustrates an operational block diagram of a wireless wireless terminal according to embodiments of the present invention. The textual data may be received, at Block 400, and displayed to a user, at Block 410. In some embodiments, a user may select all, or a portion, of the displayed text to initiate further operations. The wireless terminal 20 may include a touch sensitive display, buttons, and/or a joystick to enable a user to select text. A user's selection is sensed at Block 420. When the selected text is a phone number, the wireless terminal 20 may dial, and/or store, the selected phone number at Block 435.

The wireless terminal 20 may be configured to connect to a network. In some embodiments, the wireless terminal may include an internet browser. When the selected text is a logic network address, the wireless terminal 20 may initiate a wireless network connection via its internet browser, at Block 445. In some other embodiments, the network connection may be initiated by communicating the logic network address to another device that is capable of establishing a network connection.

A user may select the displayed text, or may otherwise provide an input (e.g., by selecting a button, switch, and/or a portion of a display on the wireless terminal 20), to cause the wireless terminal to transmit a record command, at Block 450, or a channel selection command at Block 460. In response to a record command, the broadcast media receiver 10 may record the textual data and/or the broadcast signal on the media storage device 250. In response to a channel selection command, the broadcast media receiver 10 may change one or more channels that the channel tuner 210 provides to the controller 200.

In the drawings and specification, there have been disclosed typical embodiments of the invention and, although specific terms are employed, they are used in a generic and descriptive sense only and not for purposes of limitation, the scope of the invention being set forth in the following claims. For example, when embodiments of the present invention have been described as including one or more features, or at least one of a group of features, it will be understood by one having skill in the art that the embodiment may be configured to perform only one of the features or that it may be configured to perform more than one of the features.

That which is claimed:

1. A method for displaying textual data that is embedded in a broadcast media signal, the method comprising:
   receiving a broadcast media signal at a broadcast media receiver, the broadcast media signal including textual data;
   extracting the textual data from the broadcast media signal;
   determining with a circuit within the broadcast media receiver whether the textual data represents a phone number;
   transmitting the textual data over a wireless coupling to a wireless terminal in response to determining that the textual data represents a phone number;
   receiving the textual data at the wireless terminal; and
   programmatically storing the textual data that represents a phone number in a phone book in the wireless terminal.

2. The method according to claim 1, wherein the broadcast media signal comprises a television signal.

3. The method according to claim 2, wherein:
   the broadcast media signal comprises a video signal, and
   the textual data comprises closed captioned textual data that is associated with the video signal.

4. The method according to claim 1, wherein the broadcast media signal comprises an audio signal.

5. The method according to claim 1, wherein the textual data comprises a logical network address.

6. The method according to claim 1, wherein the transmitting the textual data over a wireless coupling to a wireless terminal comprises transmitting the textual data according to a cellular communication protocol to the wireless terminal.

7. The method according to claim 1, wherein the broadcast media signal includes instructions for formatting a display of the textual data, and further comprising:
   extracting the instructions from the broadcast media signal; and
   transmitting the instructions over a wireless coupling to the wireless terminal.

8. The method according to claim 7, further comprising:
   receiving the textual data and the instructions at the wireless terminal;
   formatting the textual data using the instructions; and
   displaying the formatted textual data on the wireless terminal.

9. The method according to claim 7, wherein the instructions define the formatting a display of the textual data according to at least one of a JAVA language, a BREW language, and a wireless application protocol language.

10. The method according to claim 1, wherein transmitting the textual data over a wireless coupling is performed responsive to the circuit within the broadcast media receiver determining that the textual data represents a phone number.

11. The method according to claim 1, further comprising:
receiving the textual data, that represents a phone number, at the wireless terminal;
displaying the textual data on the wireless terminal;
sensing a user selection of the displayed textual data; and
dialing from the wireless terminal the phone number that is represented by the selected textual data responsive to sensing the user selection.

12. A method for displaying textual data that is embedded in a broadcast media signal, the method comprising:
receiving a broadcast media signal at a broadcast media receiver, the broadcast media signal including textual data;
extracting the textual data from the broadcast media signal;
transmitting the textual data over a wireless coupling to a wireless terminal;
receiving the textual data at the wireless terminal;
displaying the textual data on the wireless terminal;
sensing a user selection of the displayed textual data;
transmitting a record command from the wireless terminal over the wireless coupling to the broadcast media receiver responsive to sensing the user selection; and
recording at least a portion of the broadcast media signal on a nonvolatile media in response to the record command.

13. The broadcast media receiver according to claim 12, wherein the receiver circuit receives a television signal in the broadcast media signal.

14. The broadcast media receiver according to claim 13, wherein:
the receiver circuit receives a video signal in the broadcast media signal, and the text decoder extracts closed captioned textual data that is associated with the video signal.

15. The broadcast media receiver according to claim 12, wherein the receiver circuit receives an audio signal in the broadcast media signal.

16. The broadcast media receiver according to claim 12, wherein the text decoder extracts a logical network address from the broadcast media signal.

* * * * *

UNITED STATES PATENT AND TRADEMARK OFFICE
CERTIFICATE OF CORRECTION

PATENT NO. : 7,340,263 B2  Page 1 of 1
APPLICATION NO. : 10/295724
DATED : March 4, 2008
INVENTOR(S) : Welch It is certified that error appears in the above-identified patent and that said Letters Patent is hereby corrected as shown below:

On the title page Item 56: Please insert -- International Search Report for PCT/US03/33435 mailing date July 14, 2004 --

Signed and Sealed this

First Day of July, 2008

JON W. DUDAS
*Director of the United States Patent and Trademark Office*